United States Patent [19]

Andres et al.

[11] Patent Number: 5,412,022
[45] Date of Patent: May 2, 1995

[54] LYO GEL, ITS PRODUCTION AND ITS USE FOR SEALING

[75] Inventors: Johannes Andres, Hilden; Juergen Wichelhaus, Wuppertal; Reimar Heucher, Cologne, all of Germany

[73] Assignee: Henkel Kommanditgesellschaft auf Aktien, Duesseldorf, Germany

[21] Appl. No.: 75,551

[22] PCT Filed: Dec. 3, 1991

[86] PCT No.: PCT/EP91/02294

§ 371 Date: Jun. 14, 1993

§ 102(e) Date: Jun. 14, 1993

[87] PCT Pub. No.: WO92/10537

PCT Pub. Date: Jun. 25, 1992

[30] Foreign Application Priority Data

Dec. 14, 1990 [DE] Germany ............ 40 39 899.4

[51] Int. Cl.$^6$ ............................................. C08L 43/02
[52] U.S. Cl. .................................... 524/535; 524/476;
524/502; 524/531; 524/548; 524/556; 524/563;
524/564; 524/533; 525/274; 525/327.8;
525/330.2; 525/370
[58] Field of Search ............ 524/556, 533, 535, 531,
524/476, 502, 548, 563, 564; 525/274, 327.8,
330.2, 370

[56] References Cited

U.S. PATENT DOCUMENTS

| | | | |
|---|---|---|---|
| 4,012,567 | 3/1977 | Loveless | 526/48 |
| 4,062,817 | 12/1977 | Westerman | 525/327.8 X |
| 4,130,213 | 12/1978 | Wszolek | 525/327.8 X |
| 4,200,561 | 4/1980 | Chang | 524/556 X |
| 4,929,690 | 5/1990 | Goertz et al. | 525/327.8 X |
| 4,985,506 | 1/1991 | Blum et al. | 525/327.8 X |
| 5,149,745 | 9/1992 | Owens et al. | 525/330.2 X |
| 5,218,011 | 6/1993 | Freeman | 524/556 X |
| 5,256,705 | 10/1993 | Freeman | 524/531 X |

FOREIGN PATENT DOCUMENTS

| | | |
|---|---|---|
| 0224389 | 6/1987 | European Pat. Off. . |
| 0299718 | 1/1989 | European Pat. Off. . |
| 0371641 | 6/1990 | European Pat. Off. . |
| 2416991 | 10/1974 | Germany . |
| 2337558 | 2/1975 | Germany . |
| 2649544 | 5/1977 | Germany . |

OTHER PUBLICATIONS

Milka and Czech, "Adhäsion" (1985), pp. 29–32.
"Adhesives Age" (1989), pp. 24–29.

*Primary Examiner*—Judy M. Reddick
*Attorney, Agent, or Firm*—Ernest G. Szoke; Wayne C. Jaeschke; John Daniel Wood

[57] ABSTRACT

A lyo gel is provided in which the gelling agent is an organic, fully synthetic polymer, which is crosslinked via its carboxylic acid groups and via metal compounds, and the swelling agent is a low-volatility, inert organic liquid having a volatility, as defined by its evaporation loss, of less than 0.5% by weight after 2 hours at 105° C. in accordance with ASTM D 972. The lyo gel is useful for sealing devices involving the use of electrical current because the initially two-component reaction solution is sufficiently liquid at room temperature to fill even small spaces, such as gaps and joints between bodies.

19 Claims, No Drawings 3,412,022

LYO GEL, ITS PRODUCTION AND ITS USE FOR SEALING

BACKGROUND OF THE INVENTION

1. Field of the Invention

This invention relates to a lyo gel, to its production and to its use for sealing, more particularly devices involving the use of electrical current. The lyo gel consists of at least two components, namely a network of a copolymer containing at least one comonomer bearing functional groups of carboxylic acid and carboxylic anhydride on the one hand and polyvalent metals on the other hand as gelling agent and an organic liquid as dispersant.

2. Discussion of Related Art

One such lyo gel is described in DE-OS 26 49 544, according to which a gel is formed from an alkyl acrylate copolymer of alkyl acrylate, $\alpha,\beta$-unsaturated carboxylic anhydrides, more particularly 0.2 to about 20% by weight maleic anhydride, and ethylenically unsaturated monomers, which is dissolved in an organic solvent, and from a metal alkoxide on storage at room temperature (see page 10, lines 4 to 8). The organic solvents are readily volatile substances so that the polymer solution rapidly dries (see page 12, paragraph 2). Since gelation is undesirable, at least 20% by weight of a lower aliphatic alcohol is added and the metal alkoxides are chelated (see page 5, last paragraph to page 6, line 3 and page 10 from line 12 to page 11, paragraph 3). Octylene glycol, triethanolamine, 2,4pentanedione or lactic acid are specifically mentioned, acetyl acetonates being preferred. The copolymer solution thus stabilized is used as an adhesive. After removal of the solvent, including the alcohol, the copolymer crosslinks and gives bonds of high cohesive strength (see page 13, paragraph 2).

A similar copolymer is described by Milka and Czech in "Adhäsion" (1985), pages 29 to 32. A copolymer of 2-ethylhexyl acrylate, n-butyl acrylate and hydroxyethyl acrylate and also acrylic acid is dissolved in ethyl acetate, methyl ethyl ketone and acetone and crosslinked with titanic acid esters and metal acetyl acetonates (see page 29, middle column). Where organoyl titanate is used, a gel is formed, even in the presence of alcohols (see page 31, middle column). However, this is undesirable. Instead, the polymer solutions are used as contact adhesives because the acrylate copolymers crosslink spontaneously after evaporation of the alcohol and the other solvents (see page 29, left-hand column).

Other pressure-sensitive adhesive mixtures of the type in question are described in DE-OSS 24 16 991 and 23 37 558.

In all these cases, the object is to produce pressure-sensitive adhesives. The formation of gels is undesirable. The gels nevertheless obtained are attended, for example, by the disadvantage that, for a solids content of 10 to 60%, the rest of the solvent has to be removed which involves a contraction in volume (page 21 of DE-OS 24 16 991). A reduction in volume during drying also occurs in the case of DE-OS 23 37 558. The gels obtained are not fluid at room temperature and do not have an adequate sealing effect. There is no reference to their use as sealants.

The function of sealants is to fill gaps, joints and spaces between bodies in a volume-bridging, gas-tight and liquid-tight manner by plugging. Thus, spaces in cables and their connecting elements, such as free connectors, raceways, joint boxes, etc., are frequently filled to seal them against environmental influences, such as water, dust, air, oil, etc. and to provide mechanical and electrical protection.

Sealing systems based on the following macromolecular substances are used for this purpose:

A) thermoplastic polymers, particularly hotmelt adhesives and injection molding compounds, B) crosslinking systems (thermosets), such as epoxides, polyurethanes, etc., C) crosslinking systems (elastomers), such as silicones and other rubbers, and D) waxes, bitumen, fats and oils.

The known systems have the following disadvantages:

1.) The sealants shrink during curing and at temperatures between the application temperature and the in-use temperature. This gives rise to stresses which can even lead to cracks and leaks, particularly in the case of systems A), B) and D).

2.) The sealants can only be used within a limited temperature range because, outside this more or less narrow range, they lose mechanical strength, break, flow out or decompose. This applies in particular to systems A), B) and D).

3.) In some cases, the sealants show inadequate adhesion to various materials. This generally applies to systems A), B), C) and D).

4.) The sealants are not sufficiently plastic, for example when further contacts are introduced into the already filled space. This applies to all the sealing systems A), B), C) and D).

5.) The sealants show inadequate resistance to environmental influences, such as solvents, oils, water, etc. This applies to systems A) and D) and partly to B).

6.) Hazardous components and aggressive decomposition products are formed during mixing, filling or curing. This applies to systems B) and C).

In "Adhesives Age" (1989), pages 24 to 29, Dillmann and Sanders describe adhesives and sealants based on a thermoplastic rubber of a block terpolymer containing maleic anhydride groups (Kraton FG 1901X). To produce a sealant, 100 parts by weight of this copolymer are mixed for 45 minutes at 80° C. with 270 parts by weight Regalrez 1018 (an aliphatic hydrocarbon resin), 50 parts by weight Endex 160 (an aromatic hydrocarbon resin), 1 part by weight Irganox 1010 (a heat stabilizer), 1 part by weight Tinuvin 770 (a light absorber) and 1.5 parts by weight Tinuvin P (a UV absorber). The sealants obtained have melt viscosities of 0.7 to 2.6 Pa·s at 177° C. Sealants such as these have the disadvantage that they lose their dimensional stability beyond 60° C. In addition, they are attended by the disadvantages listed under points 1.), 2.), 4.) and 5.).

The problem addressed by the present invention was to avoid these disadvantages and, in addition, to provide a system which would be easy to handle. More particularly, the problem addressed by the present invention was to provide a sealant without any of the described disadvantages, particularly shrinkage, and with increased heat resistance. In addition, it would be useable over a wide temperature range and would be easy to handle.

According to the invention, this problem has been solved by a lyo gel in which the gelling agent is an organic fully synthetic polymer, which is crosslinked via its carboxylic acid groups and via metal compounds, and the swelling agent is a low-volatility, inert organic liquid having a volatility, as defined by its evaporation loss, of less than 0.5% by weight after 2 hours at 105° C. in accordance with ASTM D 972. The extent of swelling and the degree of crosslinking are determined by the properties required. The starting mixture of polymer solution and the solution or suspension of the metal compound 1) should be transportable and flowable per se or under pressure within the processing time in order to fill spaces,
2) should be elastically deformable under mechanical pressure within the elastic limits after gelling and
3) should permanently exhibit any electrical properties required, such as dielectric constant, dielectric strength and volume resistivity.

The expert knows or can determine by conducting a few tests what the extent of swelling and the quantities of polymer components with and without carboxylic acid derivatives should be. A ratio by weight of swelling agent to gelling agent of 1 to 20:1 is preferred. The polymers preferably contain 1 to 5% by weight components containing a carboxylic acid or its derivative.

The polymers according to the invention are homopolymers or copolymers (both statistical polymers and block and graft polymers), such as polyurethane, polyamide, polyester and polymers of monomers containing olefinic double bonds. Preferred polymers are copolymers containing an olefinic double bond which contain maleic acid or derivatives thereof, such as the anhydride and ester, either grafted on or incorporated in the chain, more particularly thermoplastic elastomers, such as styrene/ethylene/butylene/styrene block polymers containing grafted acid groups. They are commercially obtainable or may be prepared by known methods. "Functional groups" are understood to be groups which react with the metal compounds under processing conditions. In addition to the carboxylic acids, carboxylic acid esters and carboxylic anhydride groups, OH and amine groups may also be present. Although reacting only slightly, if at all, on their own, these groups are active with the other functional groups present. The free carboxylic acids react much more quickly than the corresponding anhydrides. If the functional groups are in adjacent positions, for example in the case of maleic acid, a distinctly lower concentration is sufficient than where the groups are distributed purely statistically for obtaining adequate crosslinking under otherwise the same conditions. However, the carboxylic acid groups can also be positioned at the end of the chain. Suitable polymers are ELVAX 4320 (a copolymer of ethylene, an acid comonomer and vinyl acetate having an acid value of 4 to 8), LOTADER 8750 (a copolymer of ethylene, maleic anhydride and acrylic acid ester having an acid value of 17 and a melt index of 400), KRATON FG 1901 X (an SEBS block copolymer with maleic anhydride grafted on which may be hydrolyzed or reacted with alcohols, for example ethanol) and MACROMELT 6208 (a copolyamide having an acid value of >5 and an amine value of <0.8).

Metals which can be used for crosslinking are metals of the 2nd, 3rd, 4th and 5th main groups and also transition metals, more particularly ruthenium, vanadium, chromium, cobalt, manganese, aluminium, iron, titanium, zirconium, hafnium, tin, niobium, vanadium and cerium. However, divalent metals, such as copper titanyl, cadmium, cobalt, manganese, nickel, palladium and zinc are also effective. Preferred metals are iron and zirconium. The metals are used in the form of their complexes, particularly their chelates. Suitable chelating agents are, for example, octylene glycol, triethanolamine, acetyl acetone or lactic acid. Acetyl acetone is preferred. The chelates are prepared from the metal alkoxides and the chelating agent. Their concentration influences both the degree of crosslinking and the gelling time. A molar ratio of carboxylic acid or carboxylic acid ester on the one hand and metal compound on the other hand of 0.3 to 3:1 and, more particularly, 1 to 2:1 is preferred. The metal chelates are preferably added to the polymer solutions in the form of a suspension or solution.

The low-volatility inert solvents are liquids, such as natural oils, for example mineral oil and vegetable and animal oils, and synthetic oils, for example poly-a-olefins having the general formula $R_1$—$CH_2(CH_2$—$CHR)_x$—$H$, dicarboxylic acid esters having the general formula $ROOC$—$(CH_2)_x$—$COOR$, diaryl alkanes or dialkyl benzenes, esters of polyols with carboxylic acids, polyglycols having the general formula $R_1$—$O(CHR$—$CH_2$—$O$—$)_x$—$H$, ortho phosphoric acid esters and silicone oils. Mixtures of several solvents may also be used. Preferred solvents are mineral oils and poly-a-olefins, dialkyl benzenes and diaryl alkanes. The solvents form a clear solution with the starting polymers. Their rheological behavior is comparable with that of a molecularly disperse solution. The solvent may also be used to suspend or dissolve the metal compound.

The gel may be present in the chelating agent in very small quantities.

The lyo gel according to the invention may contain other additives, although they should not affect its basic properties, more particularly fillers, diluents, stabilizers and oxidation inhibitors. The following are mentioned in particular: powder-form polymers, solid beads and hollow beads of glass or plastics, conductivity black, carbon fibers, silica, silicate and magnetic powders.

The lyo gel has the following remarkable properties: there is virtually no change in its volume compared with the starting mixture. It is dimensionally stable and elastic over a wide temperature range (−40° to more than 200° C.) without melting. It shows good adhesion to metals, such as copper and aluminium, and to plastics, such as polyethylene, polypropylene and nylon. It is readily and extremely formable over wide ranges, the ranges themselves being variable through the ratio of polymer network to organic dispersant and through the degree of crosslinking. It is largely chemically resistant. During the reaction, only the chelating agents are eliminated. The chelating agents are preferably alcohols and ketones, i.e. not aggressive or hazardous decomposition products.

The lyo gel according to the invention is generally produced as follows: 100 parts by weight of the polymer containing 5 to 100 g functional groups per kg polymer are dissolved in 50 to 2,000 parts by weight of the low-volatility inert swelling agent. The mixture is then heated in the usual way, for example to 100° to 150° C., stirred and then cooled. The preferably finely ground metal chelates are suspended or dissolved in the inert organic swelling agent with low vapor pressure (ratio by weight 1:1 to 10). They may be prepared from alcoholates by addition of the chelating agents.

100 Parts by weight of the polymer solution are mixed with 0.1 to 5 parts by weight of the metal compound in powder form, but preferably in the form of a suspension or solution, at room temperature in order to obtain uniform distribution. The mixture reacts in about 1 minute to 1 day (depending on its formulation) at room temperature and is liquid and transportable for that period, so that it can easily be introduced into a mold free from any bubbles. The reaction temperature is not critical. The reaction may take place both at −30° C. and at +60° C. The dimensionally stable lyo gel is obtained after the set gelling time of up to 1 hour.

The following reaction conditions are preferred: the following solvents are used for the preferred polymers, namely styrene/ethylene/butadiene/styrene copolymers and other copolymers of comonomer with an olefinic double bond containing maleic acid and derivatives thereof, such as anhydride and ester, either grafted on or incorporated in the chain: mineral oils, dialkyl benzenes, diaryl alkanes and poly-α-olefins.

The metal compounds have a particle diameter of preferably less than 50 μm. They are suspended or dissolved in the solvent of the polymer or in another suitable liquid. However, the metal compound may also be dissolved with addition of a relatively high-boiling hydroxy compound, for example in benzyl alcohol or in NECIRES EPX-L (a thermoplastic resin based on aromatic vinyl compounds and copolymerized phenols, OH value 65, a product of Nevcin Polymers B.V., Holland). However, the relatively high-boiling hydroxy compound may also be added to the solution of the polymer. The reaction preferably takes place at room temperature.

By virtue of its positive properties and its simple production, the lyo gel is particularly suitable for sealing devices involving the use of electrical current because the initially two-component reaction solution is sufficiently liquid at room temperature to fill even small spaces, such as gaps and joints between bodies. Its production is easy to control. This applies both in regard to the temperature, the evolution of heat and to the gelling time and in regard to non-critical mixing ratios. The plugging effect obtained is particularly good and ageing-resistant over wide temperature ranges by virtue of the firm adhesion to metals and plastics and the elastic properties. Accordingly, the space is effectively filled in gas-tight, liquid-tight and dust-tight manner. The gel is particularly effective against water. Accordingly, the gel according to the invention is particularly suitable for filling spaces in cables and their connecting elements, such as free connectors, raceways, joint boxes, etc.

The invention is illustrated by the following Examples:

EXAMPLE 1 a. Preparation of the polymer solution:
   10 parts Kraton FG 1901 X (SEBS copolymer containing approx. 2% maleic anhydride, a product of Shell) are dissolved in
   90 parts Dealen RD 25 R (mixture of diaryl alkanes and dialkyl benzenes, a product of Texaco, with an evaporation loss of 0.1% after 2 hours at 105° C. according to ASTM 972) with stirring at approx. 130° to 150° C. and the resulting solution is subsequently cooled to around 30° C.

b. Preparation of the suspension with the metal compound
   1 part iron(III) acetyl acetonate ground and sieved to a particle size of less than 50 μm are suspended in
   3 parts Dealen RD 25 R (see above).

c. Mixing of the solution and the suspension
   100 g of the solution are mixed by manual stirring with
   2.5 g of the suspension.

The mixture remains processable, i.e. fluid, for about 30 minutes at room temperature and, after about 60 minutes, has gelled to such an extent that it no longer flows out from spaces into which it has been introduced. The gel is soft from −40° C. to +200° C. without breaking or melting. It shows good adhesion to metals (Cu, Al) and to plastics (PE, PP, PA).

EXAMPLE 2 a. 100 parts of a solution according to Example 1, the concentration of the Kraton FG 1901 X being increased to 20%.

b. 10 parts of a solution of the metal compound prepared from
   5 parts zirconium(IV) acetyl acetonate dissolved in
   20 parts benzyl alcohol and subsequently diluted with
   75 parts mineral oil RD 25 R.

c. After stirring of the two solutions, the mixture remains fluid for about 3 to 5 minutes at room temperature. After 10 to 15 minutes, the mixture has gelled. The gel does not break or melt at temperatures from −40° C. to +200° C. It shows very good adhesion to metals (Cu/Al) and plastics.

EXAMPLE 3

To test the thermal stability of the lyo gel, its dropping point is determined by the following method: a glass tube with a length of 12 mm and an internal diameter of 8 mm is placed with one opening on silicone paper and filled to the brim through its other opening with a mixture of the polymer solution and metal compound. After the set gelling time, the silicone paper is removed and the filled test tube is placed in a recirculating air drying cabinet on a 2 mm mesh stainless steel gauze. With the temperature increased at a rate of approx. 5° C. per minute (linear), the temperature at which the gel or parts of the gel drop off is determined.

With the mixtures according to Examples 1 and 2, the dropping point was above 200° C., i.e. the gel did not liquefy below 100° C.

We claim:

1. A composition useful as a lyo gel sealant comprising:
   a gelling agent of (i) an organic, synthetic polymer having carboxylic acid groups and (ii) a metal compound having a metal selected from the group consisting metals of the second periodic group, the third periodic group, the fourth periodic group, the fifth periodic group and the transition metals in an amount effective to crosslink said organic, synthetic polymer, said organic, synthetic polymer having carboxylic acid groups such that said organic, synthetic polymer is crosslinkable through said metal compound, and
   an inert organic liquid having a volatility of less than 0.5% by weight, as determined after 2 hours at 105° C. in accordance with ASTM D 972, as a swelling agent for said gelling agent.

2. A composition as claimed in claim 1 wherein the ratio by weight of said swelling agent to said gelling agent is from 1 to 20: 1.

3. A composition as claimed in claim 1 wherein said composition exhibits an elastic deformability of from −40° to 200° C. and no liquefaction up to 200° C.

4. A composition as claimed in claim 1 wherein said polymer is a copolymer of at least one monomer containing an olefinic double bond and at least one comonomer containing a carboxylic acid group or one of its derivatives as a further functional group.

5. A composition as claimed in claim 1 wherein said metal compound is an iron or zirconium compound.

6. A composition as claimed in claim 1 wherein said metal compound is iron acetyl acetonate or zinc acetyl acetonate.

7. A composition as claimed in claim 1 wherein said low-volatility inert organic liquid consists of a synthetic hydrocarbon.

8. A composition as claimed in claim 1 wherein said polymer and said metals have reacted to crosslink said polymer.

9. A composition as claimed in claim 1 wherein said composition exists as first and second separate solutions, the first of said separate solutions being a solution of an organic synthetic polymer containing carboxylic acid groups or anhydrides or esters thereof in an inert organic solvent having a volatility of less than 0.5% by weight, as measured after 2 hours at 105° C. in accordance with ASTM D 972, and the second of said separate solutions being a metal compound dissolved or suspended in an inert organic liquid having a volatility of less than 0.5% by weight, as measured after 2 hours at 105° C. in accordance with ASTM D 972.

10. A method of sealing electrical devices comprising plugging gaps, joints or spaces between bodies in a electrical device with a lyo gel sealant comprising:

a gelling agent of (i) an organic, synthetic polymer having carboxylic acid groups and (ii) a metal compound having a metal selected from the group consisting metals of the second periodic group, the third periodic group, the fourth periodic group, the fifth periodic group and the transition metals in an amount effective to crosslink said organic, synthetic polymer, said organic, synthetic polymer having carboxylic acid groups such that Said organic, synthetic polymer is crosslinkable through said metal compound, and an inert organic liquid having a volatility of less than 0.5% by weight, as determined after 2 hours at 105° C. in accordance with ASTM D 972, as a swelling agent for said gelling agent.

11. A method as claimed in claim 10 wherein the ratio by weight of said swelling agent to said gelling agent is from 1 to 20: 1.

12. A method as claimed in claim 10 wherein said composition exhibits an elastic deformability of from −40° to 200° C. and no liquefaction up to 200° C.

13. A method as claimed in claim 10 wherein said polymer is a copolymer of at least one monomer containing an olefinic double bond and at least one comonomer containing a carboxylic acid group or one of its derivatives as a functional group.

14. A method as claimed in claim 10 wherein said metal compound is an iron or zirconium compound.

15. A method as claimed in claim 10 wherein said metal compound is iron acetyl acetonate or zinc acetyl acetonate.

16. A method as claimed in claim 10 wherein said inert organic liquid consists of a synthetic hydrocarbon.

17. A process for the production of a composition of matter useful as a lyo gel sealant comprising:

dissolving an organic, synthetic polymer, said polymer having functional groups which are crosslinkable through metal compounds, in an inert organic liquid, having a volatility of less than 0.5% by weight, as determined after 2 hours at 105° C. in accordance with ASTM D 972, and mixing the resulting solution with a solution or suspension of a metal compound capable of crosslinking said polymer through said functional groups, said metal compound having a metal selected from the group consisting metals of the second periodic group, the third periodic group, the fourth periodic group, the fifth periodic group and the transition metals and being present in an amount effective to crosslink said organic, synthetic polymer.

18. A process as claimed in claim 17 wherein said metal compound has a particle size of less than 50 μm.

19. A process as claimed in claim 17 wherein said metal compound is dissolved in the same solvent as said polymer.

* * * * *